Nov. 14, 1939.   F. STEBLER   2,179,868
FRUIT HANDLING MACHINE
Filed June 28, 1937   3 Sheets-Sheet 1

INVENTOR.
FRED. STEBLER.
BY Philip A. Morris
ATTORNEY.

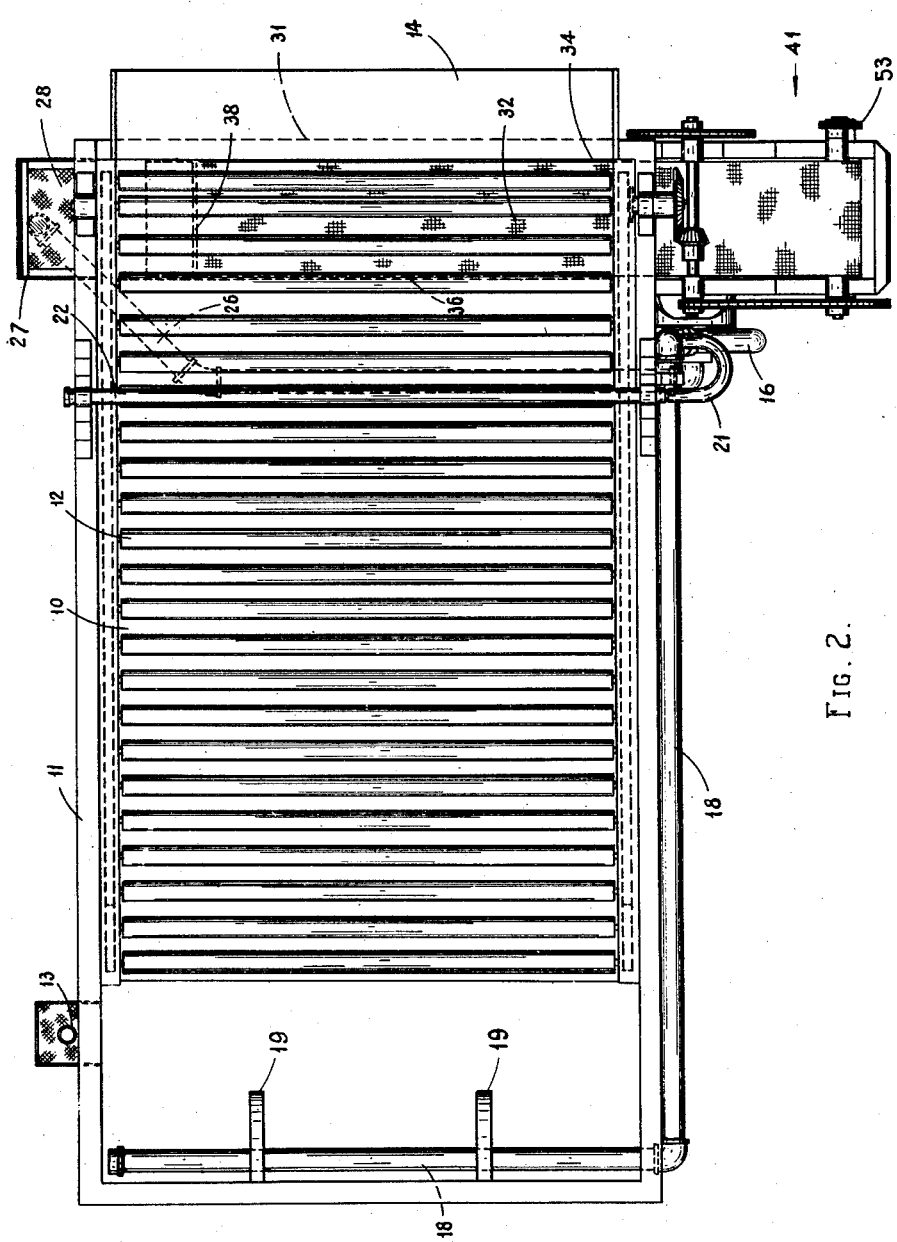

Nov. 14, 1939.   F. STEBLER   2,179,868
FRUIT HANDLING MACHINE
Filed June 28, 1937   3 Sheets—Sheet 3

INVENTOR.
FRED STEBLER.
BY Philip A. Minnis
ATTORNEY.

Patented Nov. 14, 1939

2,179,868

UNITED STATES PATENT OFFICE 2,179,868

FRUIT HANDLING MACHINE

Fred Stebler, Riverside, Calif., assignor to Food Machinery Corporation, San Jose, Calif., a corporation of Delaware Application June 28, 1937, Serial No. 150,738

7 Claims. (Cl. 146—193)

This invention is concerned with fruit handling machines and the like, and relates more particularly to improved means for separating trash such as leaves, stems and the like from the fruit before it is fed to processing machines for washing, sorting, polishing, or otherwise treating the fruit.

Customarily, fruit such as lemons, is brought from the orchard or from storage in boxes which will contain stems, leaves, and the like in addition to the fruit, so that the desirable initial step in treating fruit is to eliminate the trash from the fruit so that it will not interfere with the treating operations or clog the treating machines. With delicate, tender fruit, such as lemons, for example, it is customary to empty the boxes of fruit into a water tank in which the trash will tend to separate from the fruit, or may be positively separated therefrom by circulation of the water, pressure sprays, and the like, the fruit being removed from the tank by suitable elevating and conveying means.

It has also been proposed to provide screens in the tank through which the water must pass before recirculation so as to screen the trash therefrom and prevent circulation of any foreign matter through the pipes and the pump. Some difficulty has been encountered with the above noted constructions, however, particularly where a large amount of trash is present in the boxes of fruit, because the operation of the machine must be stopped from time to time while the screens are removed for cleaning. In accordance with my invention, the above noted disadvantageous feature is eliminated by the provision of means for continuously removing the trash from the water so that the equipment can be operated without interruption because of the accumulation of trash therein.

It is a general object of my invention, therefore, to provide improved means for eliminating the trash from fruit feeding means in a simple and expeditious manner.

Another object of the invention is to provide an improved machine of the character referred to in which the trash accumulating therein is continuously removed.

Other objects of the invention will be evident from the following description of a preferred embodiment thereof, in connection with the accompanying drawings, in which:

Fig 2 is a plan view of the machine,

Figure 1:
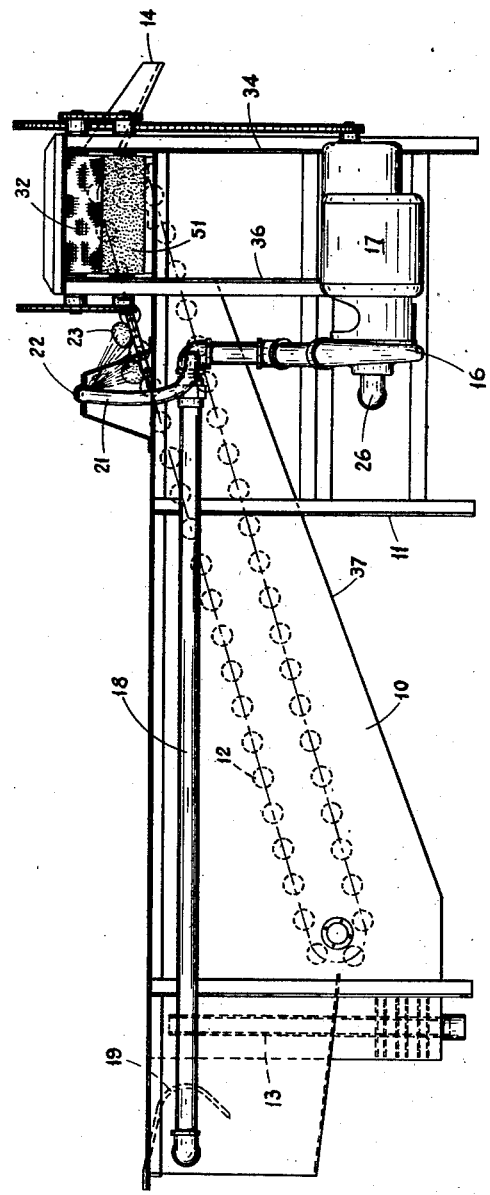
Fig. 1 is a side elevational view of a machine embodying my improved trash eliminating means.

Generally, the machine of my invention comprises a water tank 10 which is suitably mounted in a frame 11 and has an inclined roller conveyor 12 of suitable construction mounted therein so that its discharge end rises above the water level of the tank, which is determined by a removable drain pipe 13 mounted in a drain sump at one side of the tank. The pipe 13 has suitable screens mounted thereon to prevent escape of trash with the water when emptying the tank. The conveyor 12 is driven by suitable means from a motor 17 so as to pick up fruit dumped into the tank adjacent the feed end of the conveyor by inverting the box of fruit on box supporting straps 19, and discharge such fruit over a discharge chute 14 to any suitable form of processing machine, not shown.

To assist the fruit in moving from the feed end toward the discharge end so that the fruit can be picked up more readily by the conveyor, a circulation of the water in the tank may be induced from a centrifugal pump 16 driven from the motor 17 and having a discharge pipe 18 leading to the feed end of the tank and extending transversely thereacross. The portion of pipe 18 within the tank is perforated throughout its length to discharge water toward the conveyor 12, so as to move fruit thereon, and out of the way of the fruit from the next box. The pump 16 also serves, through hose connection 21 and spray pipe 22, to subject fruit such as indicated at 23 to a high pressure spray as it is lifted above the water level in the tank to carry any clinging leaves, stems, or other trash off of the fruit and into the water.

Figure 4:
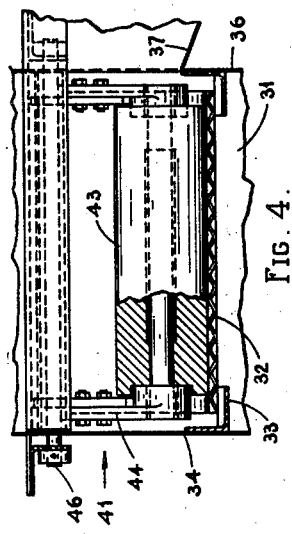
Fig. 4 is a fragmentary sectional elevation of a part of the machine, and is taken as indicated by the line 4—4 in Fig. 3.
Figure 3:
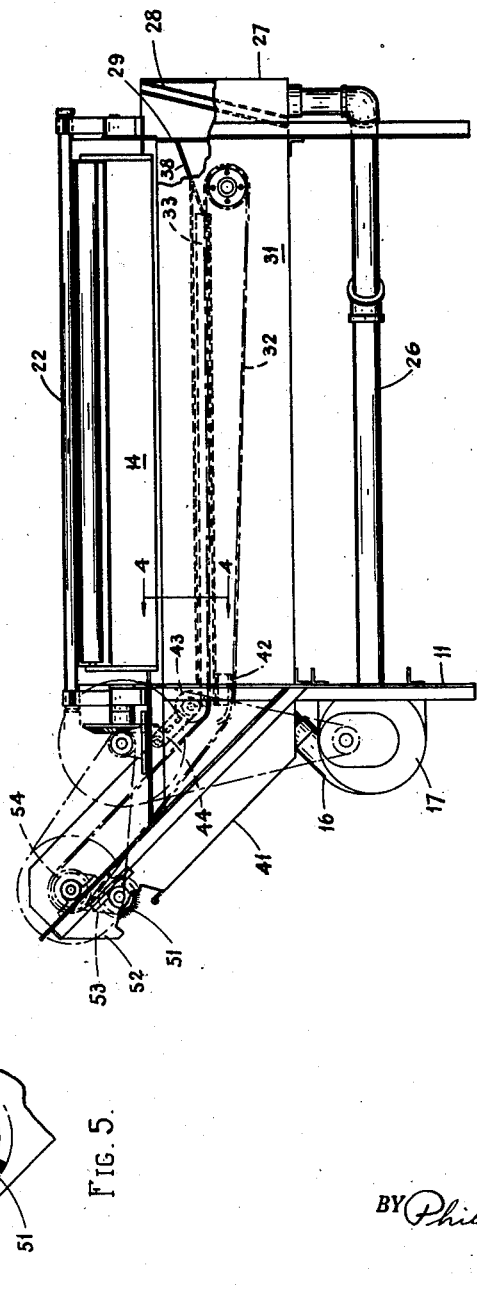
Fig. 3 is an end elevational view of the machine with a portion of the view in section to illustrate certain details of construction.

The suction side of the pump 16 is connected by a pipe 26 to a sump 27 which is separated from the remainder of the tank by removable screen 28 as seen most clearly in Figs. 2 and 3. The upper end of sump 27 is closed off from the tank by a wall 29, while the lower portion thereof connects with a transverse chamber 31 formed at the discharge end of the tank beneath a screen trash conveyor 32. As seen most clearly in Figs. 3 and 4, the conveyor 32 extends horizontally across the tank beneath the discharge end of the roller conveyor, and has its upper stretch supported by respective angles 33 suitably secured on the end wall 34 of the tank and an intermediate partition wall 36 joined with the upper end of the inclined tank bottom 37. Adjacent sump 27, a plate 38 is secured between the walls 34, 36 and 29 and extends over the conveyer 32 so that the chamber 31 only communicates with the remainder of the tank through the screen conveyer 32.

As seen in Fig. 3, the tank 10 is provided with a laterally and upwardly inclined extension 41 into which the similarly inclined end of the trash conveyer 32 extends. The lower stretch of the conveyer 32 is guided at the bend therein by a stationary guide 42, while its upper stretch is engaged and guided by a floating roller or drum 43 which has its ends journalled in similar adjustable links 44 pivoted about a transverse shaft 46 in the tank extension 41.

Figure 5:
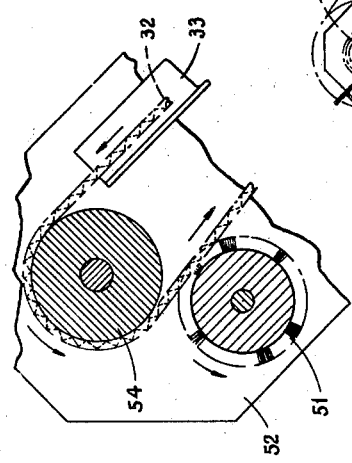
Fig. 5 is an enlarged fragmentary sectional view of the upper end of the trash conveyor.

At the elevated discharge end of the trash conveyer, a cleaning brush 51 (Figs. 3 and 5) is suitably journalled between a pair of side plates 52 so as to engage the lower stretch of the trash conveyer 32, being driven through a chain and sprocket type drive connection 53 from the driving drum 54 of the trash conveyer so as to rotate in the direction of the arrow in Fig. 5, whereby the brush serves to remove any adhering trash from the screen.

In operation, fruit dumped into the tank is caused to travel toward the discharge end of the tank by the circulation induced from the pump 16 and to be picked up by the fruit conveyer 12. The trash will tend to separate from the fruit while in the water, and any trash remaining on the fruit is removed by the high pressure spray from the pipe 22. The trash will follow the circulation of the water, which at the discharge end of the tank is downwardly through the screen-type trash conveyer 32 into the chamber 31, and thence through the screen 28 and the sump 27 to the suction pipe 26 of the pump. As the conveyer 32 is driven continuously during operation of the machine, trash which collects thereon will be discharged from the machine by the conveyer 32 and its cooperating brush 51. It will be seen, therefore, that I have provided a simple and efficient means for enabling continuous and effective use of the type of apparatus disclosed, without interference by the accumulation of trash, because the trash is continuously removed as it accumulates on the screen conveyer 32.

While I have shown and described a preferred embodiment of the invention, it is to be understood that the invention is capable of variation and modification from the form shown, and its scope, therefore, should be limited only by the scope of the appended claims.

I claim:

1. A machine for handling fruit or the like preparatory to the processing thereof, comprising a tank having a water-filled fruit dumping chamber, an inclined fruit conveyer extending upwardly out of said chamber for picking up and elevating fruit from the water therein, said conveyer having openings therethrough to permit trash and water to pass through the conveyer, a water outlet chamber below said conveyer, an endless travelling trash screen separating said fruit chamber and said outlet chamber and having a discharge point above the level of water in said tank, and water circulating means for withdrawing water from said outlet chamber and reintroducing the withdrawn water into said fruit chamber, whereby trash is carried by the circulating water against said screen for removal thereby.

2. A machine for handling fruit or the like preparatory to the processing thereof, comprising a tank having a water-filled fruit dumping chamber, an inclined fruit conveyer extending upwardly out of said chamber for picking up and elevating fruit from the water therein, said conveyer having openings therethrough to permit trash and water to pass through the conveyer, means for applying a rinsing spray to fruit on said conveyer above the level of water in said tank, a water outlet chamber below said conveyer, an endless travelling trash screen separating said fruit chamber and said outlet chamber and having a discharge point above the level of water in said tank, and water circulating means for withdrawing water from said outlet chamber and reintroducing the withdrawn water into said fruit chamber, whereby trash is carried by the circulating water against said screen for removal thereby.

3. A machine for handling fruit or the like preparatory to the processing thereof, comprising a tank having a water-filled fruit dumping chamber, an inclined fruit conveyer extending upwardly out of said chamber for picking up and elevating fruit from the water therein, said conveyer having openings therethrough to permit trash and water to pass through the conveyer, a water outlet chamber below said conveyer, an endless travelling trash screen separating said fruit chamber and said outlet chamber, means mounting said screen for substantially horizontal movement while below said conveyer and for subsequent upward movement to a trash discharging position, and water circulating means for withdrawing water from said outlet chamber and reintroducing the withdrawn water into said fruit chamber, whereby trash is carried by the circulating water against said screen for removal thereby.

4. A machine for handling fruit or the like preparatory to the processing thereof, comprising a tank having a water-filled fruit dumping chamber, an inclined fruit conveyer extending upwardly out of said chamber for picking up and elevating fruit from the water therein, said conveyer having openings therethrough to permit trash and water to pass through the conveyer, means for applying a rinsing spray to fruit on said conveyer above the level of water into said tank, a water outlet chamber below said conveyer, an endless travelling trash screen separating said fruit chamber and said outlet chamber, means mounting said screen for substantially horizontal movement while below said conveyer and for subsequent upward movement to a trash discharging position, and water circulating means for withdrawing water from said outlet chamber and reintroducing the withdrawn water into said fruit chamber, whereby trash is carried by the circulating water against said screen for removal thereby.

5. A machine for handling fruit or the like preparatory to the processing thereof, comprising a tank having a water-filled fruit dumping chamber, an inclined fruit conveyer extending upwardly out of said chamber for picking up and elevating fruit from the water therein, said conveyer having openings therethrough to permit trash and water to pass through the conveyer, a water outlet chamber below said conveyer, an endless travelling trash screen separating said fruit chamber and said outlet chamber, means mounting said screen for substantially horizontal movement while below said conveyer and for subsequent upward movement to a trash discharging position, said mounting means including a floating roller engaging the upper surface of said screen at the junction of the horizontal and inclined portions thereof, and water circulating means for withdrawing water from said outlet chamber and reintroducing the withdrawn water into said fruit chamber, whereby trash is carried by the circulating water against said screen for removal thereby.

6. A machine for handling fruit or the like preparatory to the processing thereof, comprising a tank having a water-filled fruit dumping chamber for receiving bulk fruit, an inclined conveyer extending upwardly from below the level of water in said chamber and operable to lift fruit out of the water, said conveyer having openings therethrough to permit trash and water to pass through the conveyer, means for inducing a circulation of water in said tank including means for directing the flow of water in said chamber through said conveyer to direct fruit onto said conveyer and to direct the water and trash through the conveyer, and a traveling trash conveyer interposed in the path of circulation of said water for screening the trash therefrom, said trash conveyer having a portion extending above the level of the water to a trash discharging position.

7. A machine for handling fruit or the like preparatory to processing the same, comprising a water-filled tank for receiving bulk fruit, means for circulating water through said tank, a fruit conveyer interposed in the path of water circulation for picking up the fruit, said conveyer having openings therethrough to permit the water and trash to pass therethrough, said fruit conveyer extending upwardly from the water to a discharge position above the level of water in the tank, and a trash conveyer interposed in the path of water circulation to receive the water and trash from said fruit conveyer and to screen the trash from the water, said trash conveyer having a portion extending out of the path of water circulation to a trash discharge position.

FRED STEBLER.